(12) United States Patent
Safai

(10) Patent No.: US 11,518,260 B2
(45) Date of Patent: Dec. 6, 2022

(54) FAST BATTERY CHARGING METHOD AND SYSTEM FOR LARGE POWER LOAD APPLICATIONS

(71) Applicant: The Boeing Company, Chicago, IL (US)

(72) Inventor: Morteza Safai, Newcastle, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 17/126,930

(22) Filed: Dec. 18, 2020

(65) Prior Publication Data

US 2022/0194247 A1 Jun. 23, 2022

(51) Int. Cl.
*B60L 53/50* (2019.01)
*B60L 53/51* (2019.01)
*B60L 50/60* (2019.01)
*B60L 53/55* (2019.01)
*B60L 53/10* (2019.01)
*B60L 53/52* (2019.01)
*B60L 53/18* (2019.01)
*B64D 27/24* (2006.01)
*B64F 1/36* (2017.01)
*H02J 7/00* (2006.01)
*H02J 7/35* (2006.01)

(52) U.S. Cl.
CPC ............... *B60L 53/50* (2019.02); *B60L 50/60* (2019.02); *B60L 53/11* (2019.02); *B60L 53/18* (2019.02); *B60L 53/51* (2019.02); *B60L 53/52* (2019.02); *B60L 53/55* (2019.02); *B64D 27/24* (2013.01); *B64F 1/362* (2013.01); *H02J 7/0013* (2013.01); *H02J 7/35* (2013.01); *B60L 2200/10* (2013.01); *B60L 2200/32* (2013.01)

(58) Field of Classification Search
CPC .......... B60L 53/11; B60L 53/18; B60L 53/50; B60L 53/51; B60L 53/52; B60L 53/55; B60L 50/60; B60L 2200/10; B60L 2200/32; B64D 27/24; H02J 7/0013; H02J 7/35; B64F 1/362
See application file for complete search history.

(56) References Cited

U.S. PATENT DOCUMENTS

| 2013/0080254 | A1* | 3/2013 | Thramann | B60L 53/68 |
| | | | | 705/14.57 |
| 2019/0044359 | A1* | 2/2019 | Gordon | H02J 7/0068 |
| 2019/0066878 | A1* | 2/2019 | Arndt | H01B 12/02 |

\* cited by examiner

*Primary Examiner* — Richard Isla
*Assistant Examiner* — Johali A Torres Ruiz
(74) *Attorney, Agent, or Firm* — Coats & Bennett, PLLC

(57) ABSTRACT

Renewable energy charging stations, systems, and methods are disclosed for capturing storing and delivering large amounts of renewable electrical energy from a renewable energy source to vehicles including passenger aircraft using charging circuits in communication with a demultiplexer and high-temperature superconducting cables to deliver required large electrical charges at fast charging rates safely and at low temperatures.

29 Claims, 8 Drawing Sheets

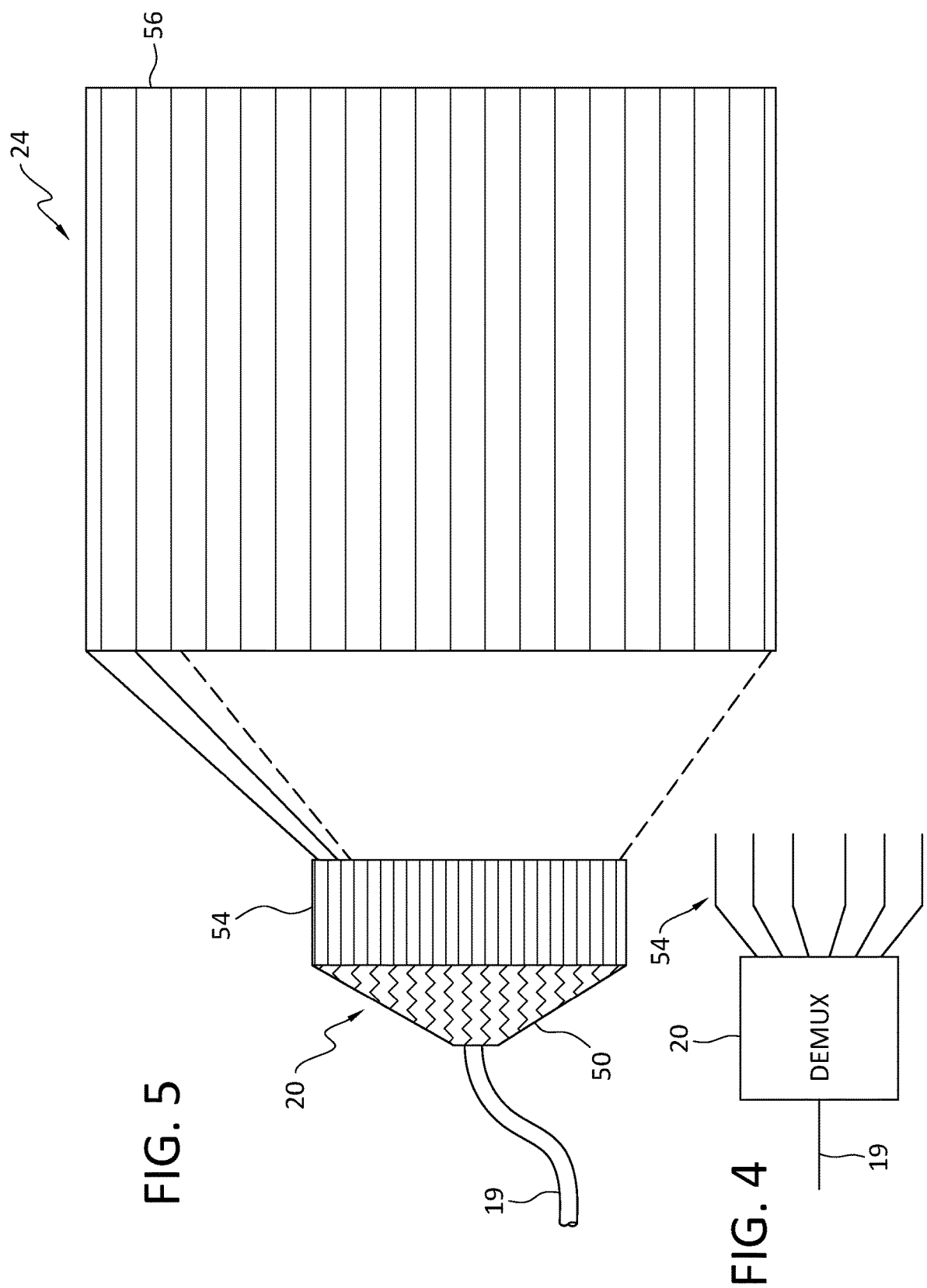

FAST BATTERY CHARGING METHOD AND SYSTEM FOR LARGE POWER LOAD APPLICATIONS

TECHNOLOGICAL FIELD

The present disclosure relates generally to the field of harvesting renewable energy and energy distribution for charging large vehicle demands. More specifically the present disclosure relates to the field of energy capture, storage, and distribution.

BACKGROUND

Since their incorporation into today's society, large vehicles comprising combustion engines continue to require the use of fossil fuels as a source of combustible power generation. While alternative energy sources that minimize or eliminate the use of fossil fuels have gained some traction in the automobile industry, the operation of large vehicles, including passenger and cargo aircraft have not incorporated alternative power generation, mostly due to the significant amount of power required to operate such vehicles that require significant energy to operate for extended duration over significant distances. Unless explicitly identified as such, no statement herein is admitted as prior art merely by its inclusion in the Background Section.

SUMMARY

According to a present aspect, a system is disclosed for harvesting, storing, and dispensing energy, with the system including a renewable energy collection device configured to collect electrical energy from a renewable source, said renewable source comprising at least one of: solar power, wind power, and hydroelectric power. The system further includes a high- voltage capacitor in communication with the renewable energy collection device, a first high temperature superconducting cable in communication with the capacitor, a transformer in communication with the first high temperature superconducting cable, a second high temperature superconducting cable in communication with the transformer, and at least one demultiplexer in communication with the second high temperature superconducting cable, with the at least one demultiplexer configured to engage a circuit, said circuit configured to deliver converted electrical energy to a plurality of rechargeable vehicle batteries, wherein the capacitor is configured to process electrical power ranging from about 250 MW to 1000 MW, and wherein the demultiplexer is configured to deliver up to about 1000 MW of electrical power. According to present aspects, at least one of the capacitor and the transformer comprise an integrated multiplexer, or at least one of the capacitor and the transformer are otherwise in communication with at least one multiplexer.

In another aspect, the demultiplexer is configured to deliver electrical energy at a rate ranging from about 250 MW to about 1000 MW from the demultiplexer to the rechargeable vehicle battery at a charging rate ranging from about 25 MWH to about 100 MWH.

In another aspect, the plurality of rechargeable vehicle batteries comprises at least one lithium ion cell.

In a further aspect, the plurality of rechargeable vehicle batteries comprises a plurality of lithium ion cells.

In another aspect, the high-voltage capacitor comprises the electrical energy storage banks.

In another aspect, the system operates wherein a temperature during a transfer of an amount of electrical energy through the system does not exceed a temperature of about 45° C.

In a further aspect, the system has an operating temperature range ranging from about −30° C. to about 45° C.

In another aspect, during operation, a temperature increase of about 25° C. or less is realized during operation of the system and during the distribution of energy from the demultiplexer to the rechargeable vehicle batteries.

In another aspect, demultiplexer comprises relay mechanisms, said relay mechanisms configured to distribute a predetermined amount of electrical energy to each of the plurality of the vehicle battery cells.

According to another present aspect, a system for harvesting, storing, and dispensing energy is disclosed, with the system including a renewable energy collection device configured to collect electrical energy from a renewable source, with the renewable source comprising at least one of solar power, wind power, and hydroelectric power, a high-voltage capacitor in communication with the renewable energy collection device, a first high temperature superconducting cable in communication with the capacitor, a transformer in communication with the first high temperature superconducting cable, a second high temperature superconducting cable in communication with the transformer. The system further includes at least one demultiplexer in communication with the second high temperature superconducting cable, said demultiplexer configured to engage a circuit, with the circuit configured to be in communication with a plurality of rechargeable vehicle batteries, and a vehicle comprising a plurality of rechargeable vehicle batteries in communication with the circuit, said rechargeable vehicle batteries configured to receive converted electrical energy from the demultiplexer via the circuit. According to present aspects, at least one of the capacitor and the transformer comprise an integrated multiplexer, or at least one of the capacitor and the transformer are otherwise in communication with at least one multiplexer.

In another aspect, the vehicle comprises an aircraft.

In a further aspect, the vehicle comprises at least one of a crewed aircraft, an uncrewed aircraft, a crewed rotorcraft, an uncrewed rotorcraft, a crewed spacecraft, an uncrewed spacecraft, a crewed terrestrial vehicle, an uncrewed terrestrial vehicle, a crewed surface waterborne vehicle, an uncrewed surface waterborne vehicle, a crewed sub-surface waterborne vehicle, an uncrewed sub-surface waterborne vehicle, a hovercraft, and combinations thereof.

In another aspect, the plurality of rechargeable vehicle batteries comprises lithium ion cells.

In another aspect, the system includes a t least one electrical energy storage device in communication with the high-voltage capacitor.

In another aspect, up to about 250 MW of electrical energy is delivered to the high-voltage capacitor, with the capacitor configured to deliver up to about 250 MW of electrical energy from the capacitor to the electrical energy storage device.

In a further aspect, the electrical energy storage device comprises a plurality of electrical energy storage cells.

In another aspect, up to about 1000 MW of converted electrical energy is delivered to the circuit from the multiplexer.

In a further aspect, a temperature during a transfer of an amount of electrical energy through the system does not exceed a temperature of about 45° C.

In another aspect, the system has an operating temperature range ranging from about −30° C. to about 45° C.

In a further aspect, the electrical energy storage device is configured to store renewable energy collected by the renewable energy collection device.

In a further aspect, the capacitor is a high-voltage capacitor configured to convert up to about 250 MW of electrical energy.

In another aspect, at least one of the plurality of rechargeable vehicle batteries comprises a plurality of rechargeable lithium ion battery cells.

In another aspect, the demultiplexer is configured to deliver electrical energy at a rate ranging from about 250 MW to about 1000 MW from the demultiplexer is further configured to deliver electrical energy to the rechargeable vehicle battery at a charging rate ranging from about 25 MWh to about 100 MWh.

In another aspect, the demultiplex is configured to substantially fully charge at least one of a plurality of rechargeable lithium ion battery cells to a substantially full lithium ion battery cell capacity during a charging duration ranging from about 10 mins to about 180 mins.

In another aspect, the demultiplexer is configured to substantially fully charge at least one of a plurality of rechargeable lithium ion battery cells to a substantially full lithium ion battery cell capacity during a charging duration ranging from about 10 mins. to about 50 mins.

In another aspect, electrical energy is delivered to the plurality of rechargeable lithium ion battery cells from the demultiplexer at a temperature of less than about 45° C. during the dispensing of the electrical energy to the plurality of rechargeable lithium ion battery cells.

In a further aspect, the renewable energy source comprises at least one of solar power, wind power, hydroelectric power, and combinations thereof.

The features, functions and advantages that have been discussed can be achieved independently in various aspects or may be combined in other aspects, further details of which can be seen with reference to the following description and the drawings.

In another aspect a method is disclosed, with the method comprising collecting renewable energy from a renewable energy source to form collected electrical energy, converting the collected electrical energy using at least one capacitor to form converted electrical energy, directing converted electrical energy from the at least one capacitor via a first high temperature super conducting cable to a transformer, and directing converted electrical energy from the transformer via a second high temperature super conducting cable to a demultiplexer. The disclosed method further comprises distributing converted electrical energy from the demultiplexer to at least one rechargeable vehicle battery, maintaining a temperature ranging from about −30° C. to about 45° C. during the distribution of the converted electrical energy from the demultiplexer to the rechargeable vehicle battery, and substantially fully charging the rechargeable vehicle battery. According to a disclosed method, an amount of electrical energy from about 250 MW to about 1000 MW is distributed from the demultiplexer to the rechargeable vehicle battery at a charging rate ranging from about 1 MWh to about 100 MWh and at least one of the capacitor and the transformer is in communication with at least one multiplexer.

In another aspect, the demultiplexer is configured to deliver up to about 1000 MW of electrical energy to at least one of a battery (e.g., an electrical energy) storage bank and a plurality of rechargeable vehicle batteries.

In another aspect, a method further comprises distributing converted electrical energy from the demultiplexer to the electrical energy storage bank, and distributing converted electrical energy from the energy storage bank to a second demultiplexer, and delivering converted electrical energy from the energy storage bank via the demultiplexer to a plurality of rechargeable vehicle batteries in an amount ranging from about 250 MW to about 1000 MW in a duration ranging from about 10 mins to about 50 mins.

In another aspect, the capacitor comprises the electrical energy storage banks.

In a further aspect, the electrical energy storage bank comprises a plurality of storage battery cells.

In a further aspect, the rechargeable vehicle battery comprises at least one rechargeable lithium ion battery cell.

In another aspect, the rechargeable vehicle battery comprises a plurality of rechargeable lithium ion battery cells.

In another aspect, a method further comprises charging the at least one rechargeable lithium ion battery cell to a substantially fully charged lithium ion vehicle battery cell capacity at a charging rate ranging from about 25 MWh to about 100 MWh.

In a further aspect, a method further discloses delivering the converted electrical energy to a plurality of rechargeable lithium ion battery cells to substantially fully charge a plurality of rechargeable lithium ion vehicle battery cells within a specified charging duration equal to from about 10 mins to about 3 hours.

In another aspect, a method further comprises distributing converted electrical energy to the at least one lithium ion battery cell at a temperature of less than about 45° C. during a duration of distributing the converted electrical energy to the rechargeable vehicle battery.

In a further aspect, a method for harvesting, storing, and dispensing energy is disclosed comprising collecting energy from a renewable energy source to form an amount of collected electrical energy, converting the collected electrical energy using a capacitor to form converted electrical energy, storing an amount of the converted electrical energy in a plurality of electrical energy storage banks to form an amount of stored electrical energy, dispensing at least one of: the converted electrical energy and the stored electrical to at least one rechargeable vehicle battery via at least one high temperature superconducting cable, and dispensing at least one of: the converted electrical energy and the stored electrical energy via a demultiplexer to at least one rechargeable vehicle battery at a charging rate ranging from about 25 MWh to about 100 MWh.

According to another aspect, the capacitor is in communication with at least one multiplexer, and the demultiplexer is configured to deliver an electrical voltage of up to about 1000 MW to at least one of a battery storage bank and the plurality of rechargeable vehicle batteries.

In a further aspect, at least one multiplexer is integrated into the capacitor.

In another aspect, at least one high temperature superconducting cable is in communication with the plurality of the electrical energy storage banks, said high temperature superconducting cable further in communication with the demultiplexer.

In another aspect, the demultiplexer is in communication with the plurality of electrical energy storage banks and the demultiplexer is further in communication with the plurality of vehicle battery cells.

In a further aspect, the demultiplexer comprises dedicated relay mechanisms, said dedicated relay mechanisms configured to distribute a predetermined amount of converted electrical energy to the at least one rechargeable vehicle battery cells.

In another aspect, the renewable energy source comprises at least one of: solar power, wind power, hydroelectric power, and combinations thereof.

In another aspect, a method further comprises, after the step of storing an amount of the converted electrical energy, directing electrical energy from the demultiplexer to a plurality of circuit outputs said plurality of circuit outputs individually dedicated to and in communication with one of a plurality of rechargeable vehicle batteries.

BRIEF DESCRIPTION OF THE DRAWINGS

Figure 1:
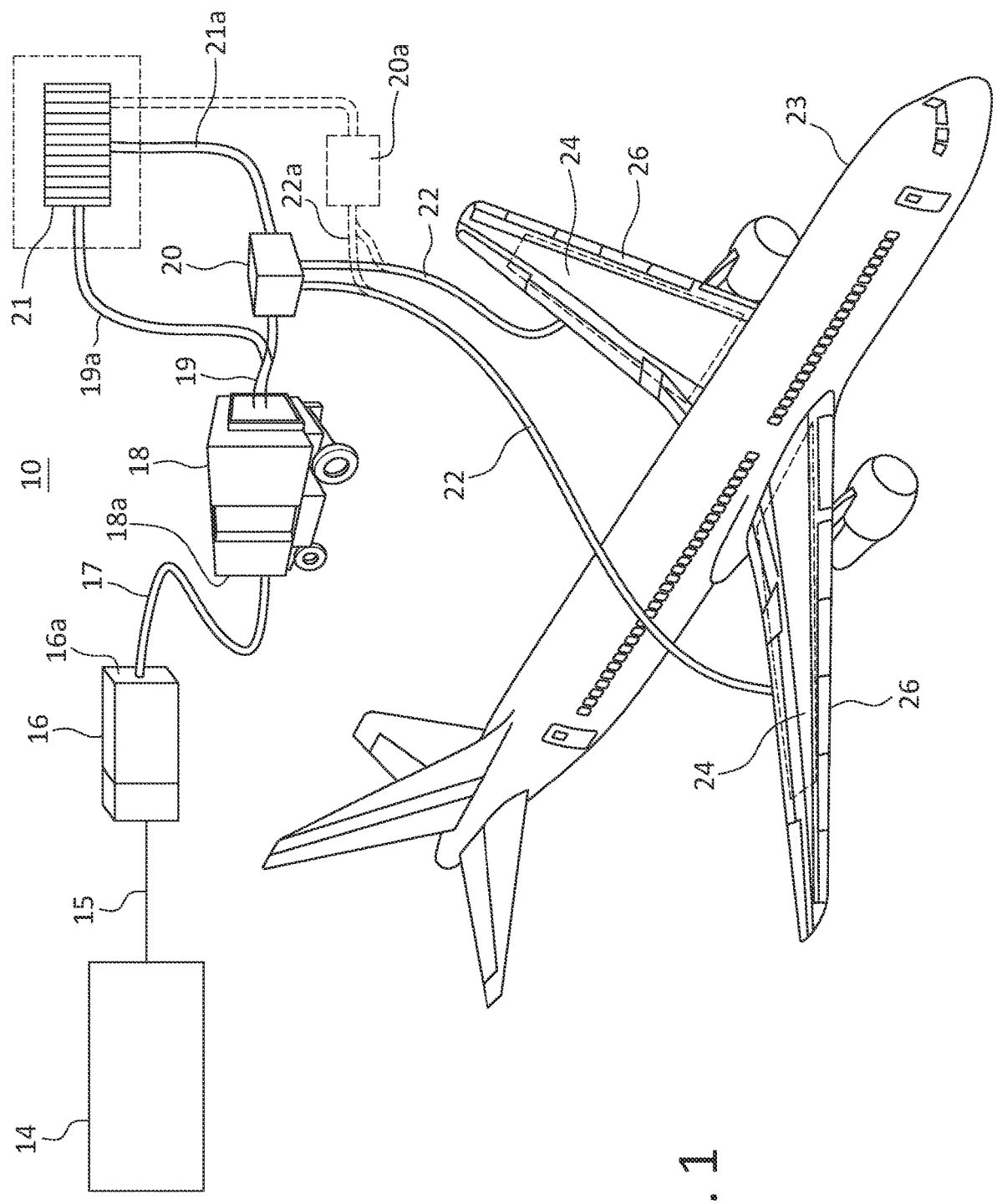
Figure 2:
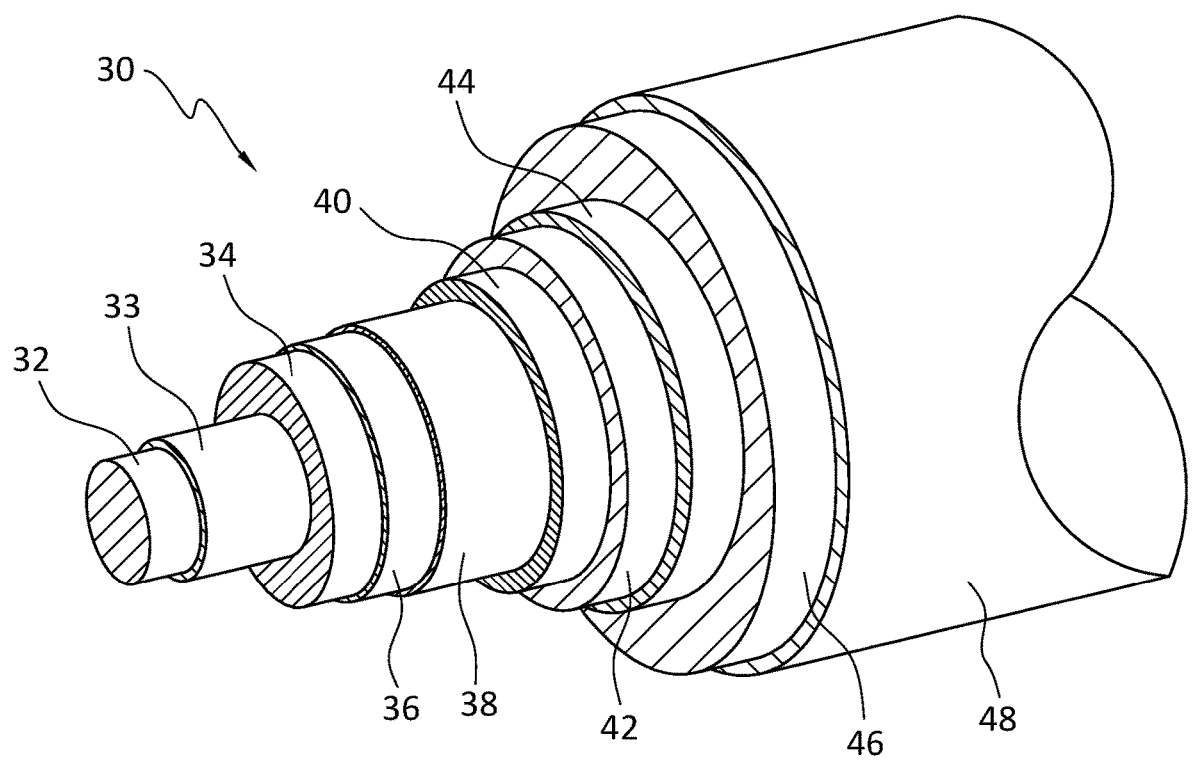
Figure 3:
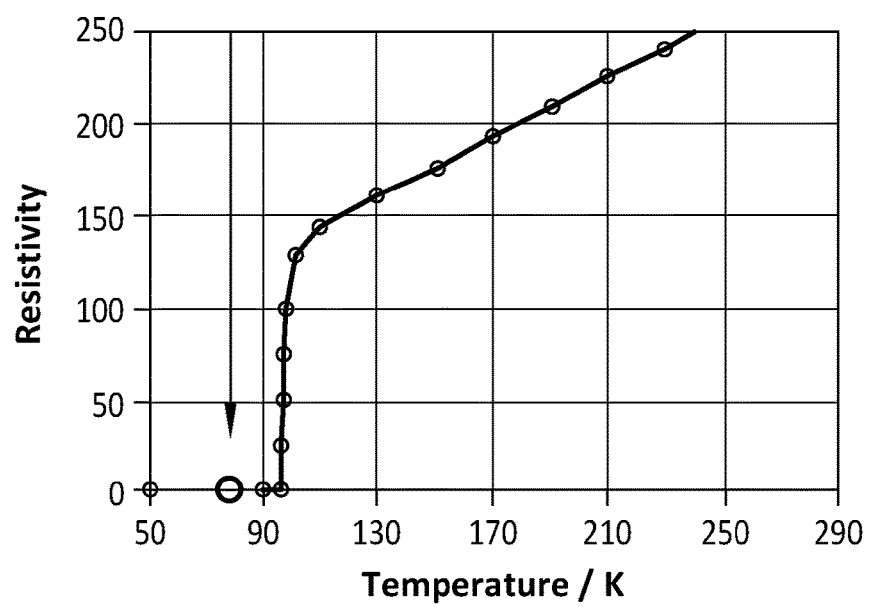
Figure 6:
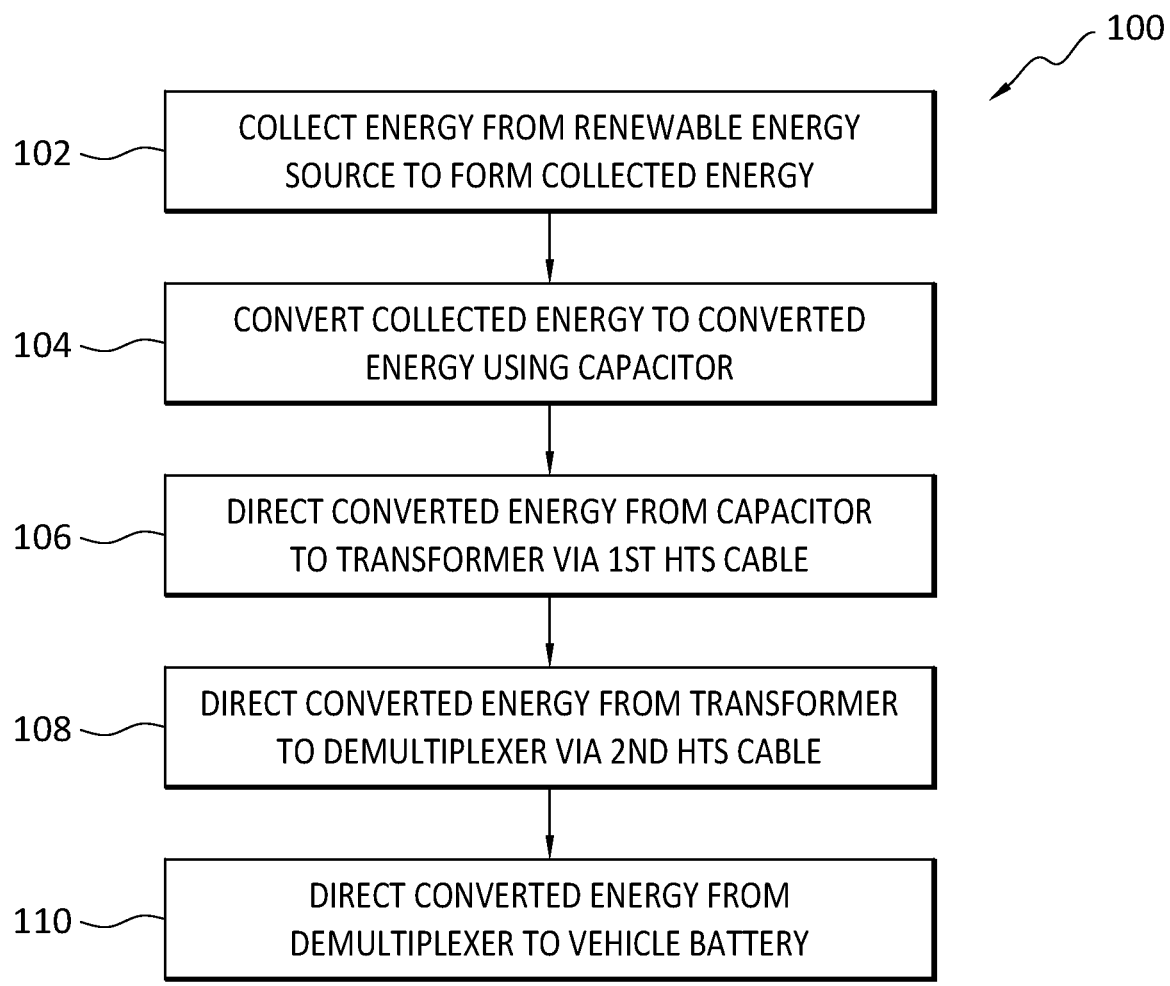
Figure 7:
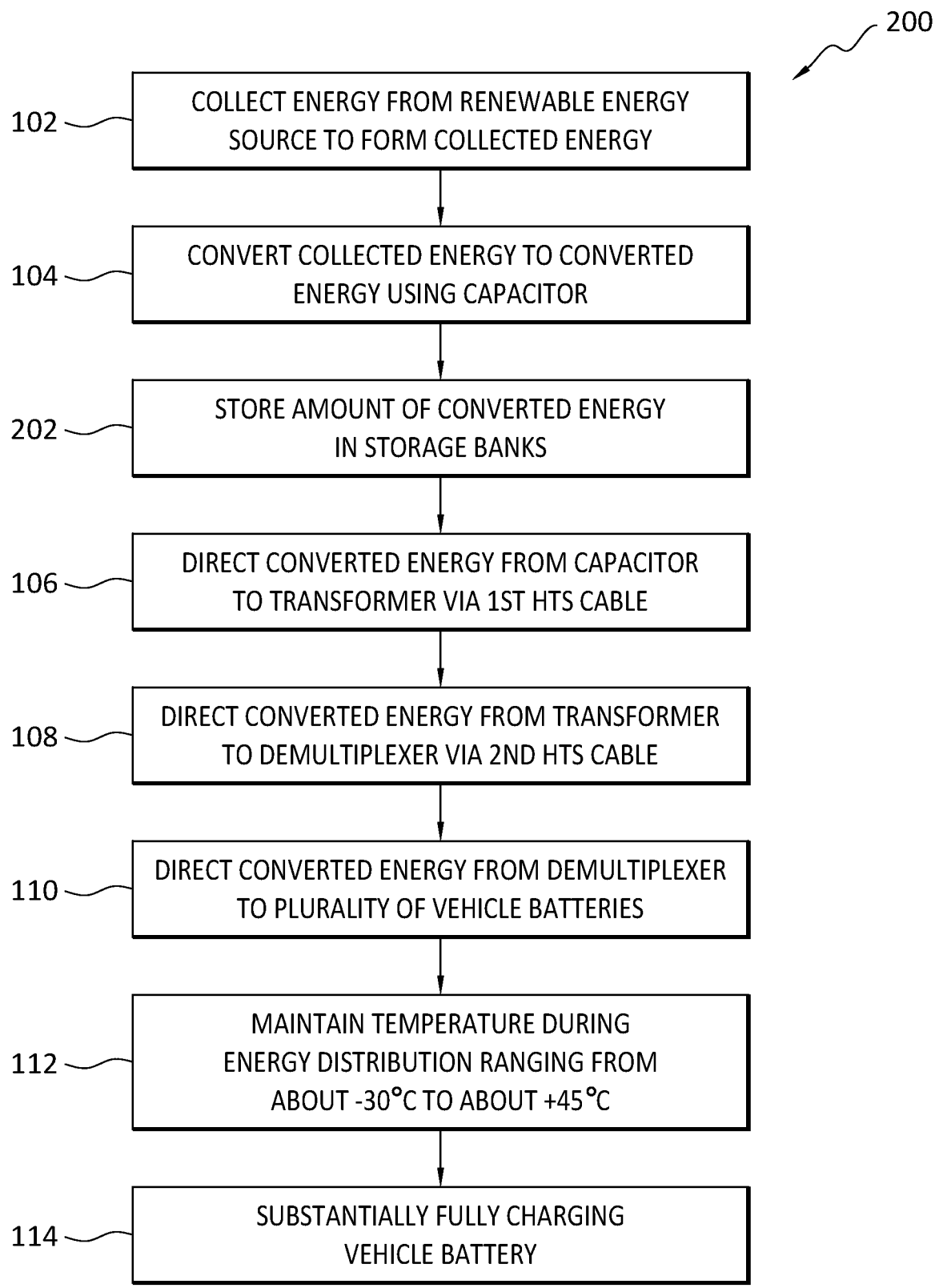
Figure 8:
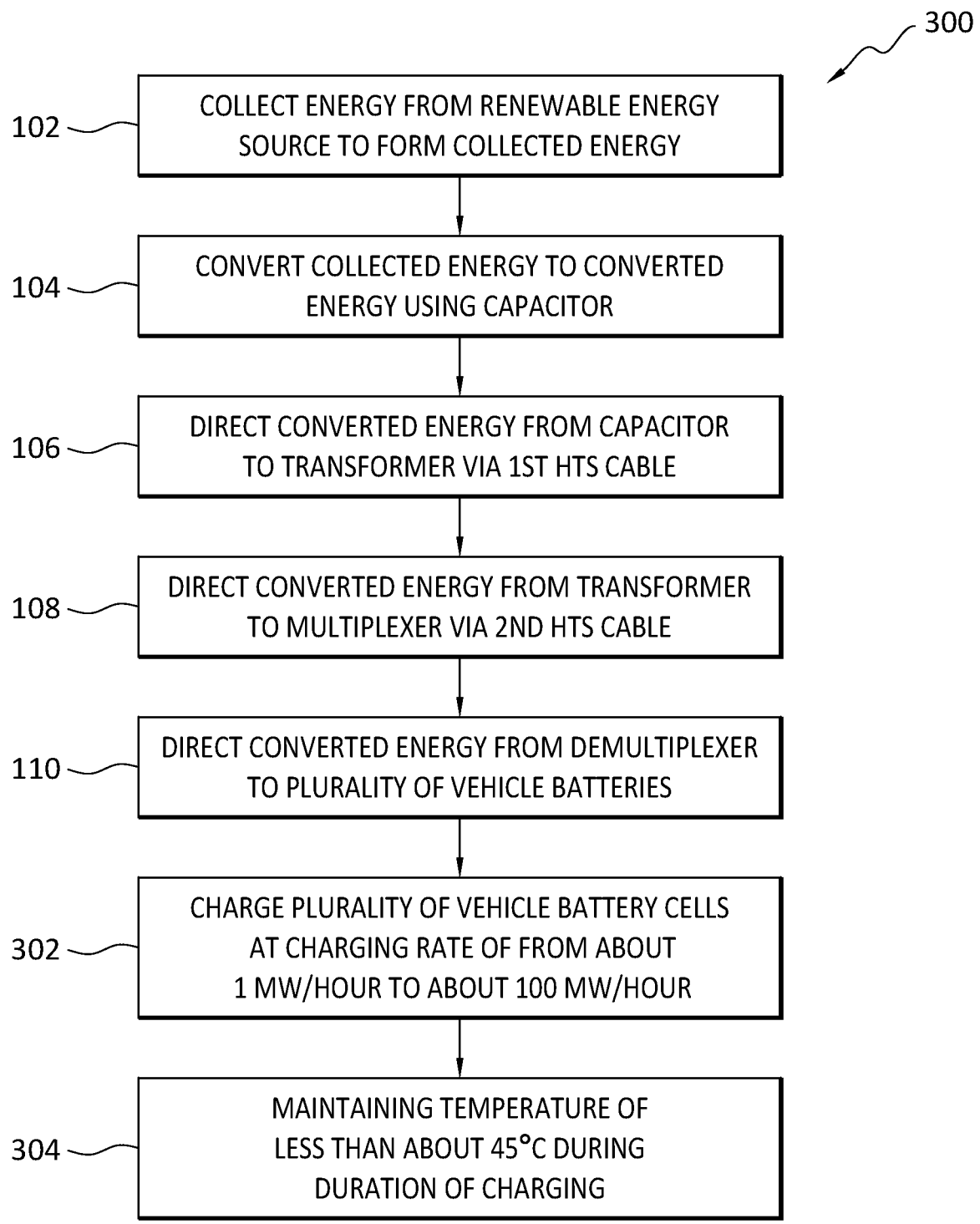
Figure 9:
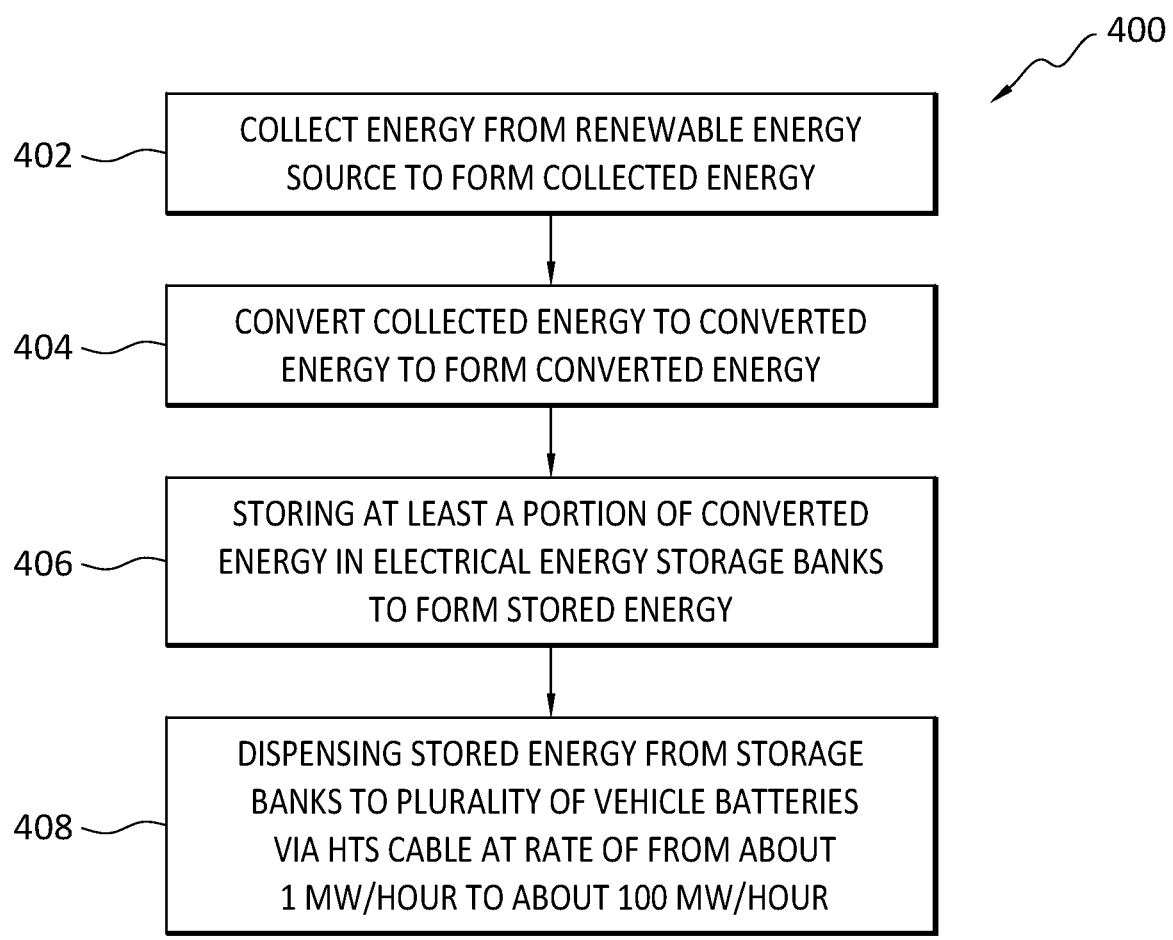

Having thus described variations of the disclosure in general terms, reference will now be made to the accompanying drawings, which are not necessarily drawn to scale, and wherein:

FIG. 1 is an illustration of a renewable energy collection, storage, and charging system, according to present aspects;

FIG. 2 is partially exposed view of a high temperature super conducting cable according to present aspects;

FIG. 3 is a graph plotting resistivity versus temperature;

FIG. 4 is an illustration of a demultiplexer used according to present methods;

FIG. 5 is an illustration of a demultiplexer used according to present aspects;

FIG. 6 is a flowchart illustrating a method according to present aspects;

FIG. 7 is a flowchart illustrating a method according to present aspects;

FIG. 8 is a flowchart illustrating a method according to present aspects;

FIG. 9 is a flowchart illustrating a method according to present aspects; and

Figure 10:
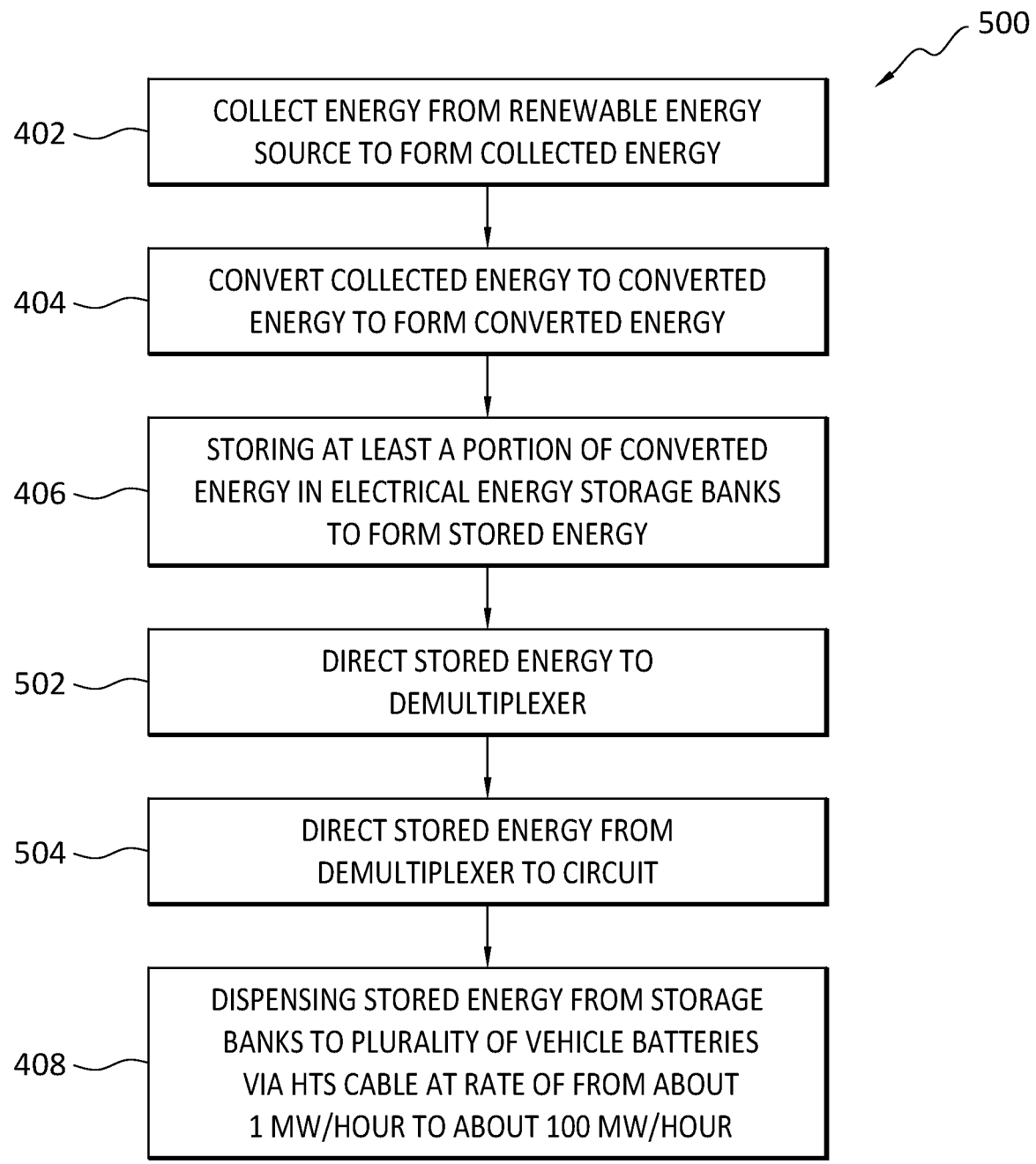

FIG. 10 is a flowchart illustrating a method according to present aspects.

DETAILED DESCRIPTION

Present systems, methods and apparatuses are directed to the sustainable collection, conversion, storage, quick transfer, and efficient delivery of large amounts renewable energy (e.g., in the form of converted electricity) to vehicle battery cells, including the collection, conversion, transfer, and delivery of the renewable energy to rechargeable lithium ion vehicle battery cells and electrical energy storage banks (e.g., battery storage banks, etc.). Vehicles including, for example, a passenger or cargo aircraft can comprise rechargeable lithium ion vehicle battery cells (e.g., lithium ion vehicle battery cells, etc.) in such vehicles, with the vehicle battery cells charged via the systems and methods disclosed herein. According to present aspects, the entire presently disclosed systems and methods comprise collecting, converting, and delivering renewable energy in the form of electrical vehicle end-use charges "off-grid" with respect to a community or geographic area's energy demand and/or energy "draw".

In the transportation industry, for example, there are significant practical issues facing the use of electricity as an energy source for rapid and schedule-sensitive charging of large vehicles, including, for example, passenger and cargo aircraft, as well as the rapid and schedule-sensitive charging of terrestrial vehicles and terrestrial vehicle fleets including, for example, cars, buses, trucks, etc.

Present aspects address the previous difficulties that can include the impact of a critical power drain on a geographic region during a significant diversion of vast amounts of electrical "power" required from a geographic power supply, or power "grid", for large vehicle electrical charging of vehicle batteries (e.g., charging vehicle batteries substantially to the vehicle battery capacity) in a short duration. Further present aspects address prior electrical charging issues including, for example, the conditions for electrical energy transfer and storage (including, e.g., issues and conditions relating to, for example, powering of rechargeable batteries to capacity, heat generation, charging time, charging rate, etc.) that are required for the safe charging of large vehicles and the regular and frequent charging of a large number of ground vehicles, vehicle fleets, etc. (also referred to equivalently herein as "terrestrial vehicles"). Further present aspects address issues that have frustrated and otherwise have inhibited the practical adoption of electrical charging facilities for large vehicles and large numbers of vehicles requiring frequent, scheduled charging, and that can require large amounts of electrical energy transfer from renewable energy sources at fast charging rates.

Aspects of the present disclosure achieve a workable solution for the delivery of large amounts of electrical energy from a renewable energy source, without dedicating or diverting electrical energy from a geographic area's power grid. The delivery of such large energy amounts in this fashion is referred to herein as delivering collected energy "off-grid".

Present aspects are further directed to methods, systems, and apparatuses for quickly charging and powering large vehicles and quickly charging and powering a large number of smaller vehicles especially when such frequent, scheduled charging must occur in a short timeframe (e.g. from about 10 minutes to about 50 minutes for terrestrial vehicles, and from about 60 minutes to 180 minutes for larger vehicle including, for example, aircraft, etc.), without sustaining a significant increase in localized system temperatures that ordinarily would occur with respect to the amount of electrical power transfer that would be required to be delivered to batteries from an electrical source in a workable (e.g., a condensed) charging time.

In addition, in the case of passenger and cargo aircraft, electrically powered aircraft must be able to travel significant distances on a single charge, and travel to varied destinations, requiring the existence of charging capabilities at multiple destinations along a particular aircraft's route (or e.g., otherwise have a travel range significantly shortened by the need to return to the location of the original charging station). Present aspects disclose systems for delivering electrical energy to substantially fully charge a bank of rechargeable batteries in an aircraft (e.g., a bank of rechargeable lithium ion batteries) that is sufficient to provide the aircraft with adequate power over a range suitable to complete a flight having a predetermined distance, charging the aircraft batteries in a short charging cycle of from about 1 to about 3 hours, and at a charging temperature that does not exceed about 45° C., and directing converted electrical energy to charge the vehicle batteries from a renewable energy source. "Substantially fully charging" a battery cell refers to the state of charging a battery cell to a battery cell charging capacity that may be a value less than 100% charges, but that is in excess of or equal to a rechargeable battery charging capacity that is equivalent to about 95% charged.

Present aspects are directed to methods, systems, and apparatuses that successfully enable the use of electrical energy captured from renewable energy sources with the electrical energy converted into and, if desired, also stored as converted electrical energy that can be quickly delivered to charge batteries of electrically powered vehicles, in daytime hours or nighttime hours, including, for example, small or large passenger aircraft and large cargo aircraft. Methods, apparatuses, and systems are set forth herein for collecting renewable energy, and converting, storing, and delivering amounts of renewable electrical energy directly to vehicle battery banks, and also to storage banks that can be located remotely from a vehicle without incurring significant and potentially dangerous heat increases, and, instead limits heat increases during a charging event to less than about 25° C. above an ambient temperature (e.g., a maximum heat increase of about 25° C. above an ambient temperature such as above a room temperature of about 20° C.). In other words, the present charging methods and systems occur at a maximum temperature of about 45° C. during the charging cycle duration. Further, the charging cycle can occur at an operating charging temperature ranging from about −30° C. to about 45° C.

According to present aspects, the charging event (equivalently referred to herein as "charging cycle") delivers a full and substantially complete battery charge to rechargeable battery cells to power a large vehicle for predetermined operational ranges, while significantly reducing the time of a charging event to time frames that substantially meet acceptable refueling schedules (e.g., substantially matching or being only slightly longer than present passenger aircraft refueling times and schedules when refueling an aircraft with fossil fuels, etc.).

Present aspects further contemplate the storage of converted electrical energy (e.g., converted from renewable energy sources) into large storage banks from which the stored converted electrical energy can be distributed to rechargeable vehicle batteries to power vehicles including, for example, large passenger and large cargo aircraft, even during nighttime hours (e.g., hours when renewable solar energy cannot be harvested). Such contemplated storage bank include, for example and without limitation, large above-ground or below-ground structures that can comprise salt tanks, or other rechargeable devices that can be high volume rechargeable battery cells, etc. Such storage banks can be located proximate to, or remotely from the renewable electrical energy collection devices, capacitors, transformers, and end-use points of electrical energy distribution to rapidly recharge vehicles, including aircraft.

According to present aspects, renewable energy is collected, or "harvested", from a renewable energy resource (referred to equivalently herein as a "renewable energy source") that can be solar power, hydroelectric power, wind power, etc., by implementing a suitable energy collection device in proximity to (for example, within from about 0.1 miles to about 3 miles from) the point of energy discharge (e.g., the "charging station") to achieve and facilitate the collection, storage, and delivery of the collected renewable energy at a scale that can collect from about 250 MW to about 1000 MW of electrical energy.

In the case of a solar panel array, for the purpose of collecting solar energy on a scale thought to be necessary to charge an energy storage bank that is to be used in presently disclosed systems, according to present aspects, the energy collection device (e.g., in the form of a solar panel array) can be configured to collect an amount of solar energy ranging from about 250 MW to about 1000 MW. By way of example as to scale or energy made available, according to present aspects, 10,000 solar panels producing more than 3.6 million KW hours annually can provide enough power for more than 325 average-sized US homes. The presently contemplated solar energy collection array can comprise any number of solar panels having a predetermined rated degree of collection efficiency, with the understanding that the array selected for use as a part of the presently disclosed systems collects an amount of solar energy at a rate ranging from at least about 250 MWh to about 1000 MWh.

According to present aspects the methods, systems, and apparatuses integrate components into a system that collects, converts, and delivers vast amount of electrical energy required to make electrical powering of vehicles (including, e.g., aircraft) practical, convenient, and safe without diverting electrical energy from a geographic electric power grid. The present systems, that are discrete from any geographic power grid, include and integrate components capable of capturing or collecting renewable energy, and can position and locate the energy capture and collection components proximate to and in communication with (e.g., within miles or less) an energy storage and distribution facility that can directly deliver electrical energy converted from the renewable energy source to a vehicle for the purpose of charging, for example, a battery-operated vehicle or battery-containing hybrid vehicle.

According to present aspects, the incorporation of high temperature superconducting cables affords present systems with the capability of safely delivering converted electrical energy to a storage bank, or safely delivering converted electrical energy directly to an end vehicular charging use at high electrical discharge/charging rates. The incorporation of the high temperature superconducting cables in conjunction with the incorporated multiplexers and demultiplexers, creates a system that can deliver high amounts of electrical energy required to power and charge the batteries of electric vehicles efficiently, rapidly, and at safe charging temperatures during charging cycles of relatively short duration (e.g., from about 10 mins for cars, for example, up to from about 1 hour to about 3 hours for larger vehicles including, for example, aircraft). That is, according to present aspects, the disclosed methods, systems, and apparatuses achieve electrical discharge/charging rates on the order of 250 MW/hour (250 megawatts per hour; with one megawatt equal to 1,000 kilowatts and equal to 1,000,000 watts) to about 1000 MW/hour, without increasing localized temperature more than about 25° C. above ambient temperature (and not exceeding an operating temperature of about 45° C.), while operating at temperatures ranging from about −30° C. to about 45° C.).

The present methods, systems, and apparatuses therefore address and solve issues of overheating during the charging of electric vehicles that can require electrical power ranging from about 250 MW to about 1000 MW. Theoretical attempts to deliver this range of electrical energy without realizing and incurring a significant temperature increase (and risking system overheating and the attendant dangers of overheating including system damage, vehicle damage, injury, etc.), have previously required significantly long and slow charging durations (e.g., charging duration in excess of 24 hours, etc.).

For example, systems required to effectively and efficiently deliver electrical power on the order of 250 MW to 1000 MW in a useful and practical time frame (similar to the presently disclosed charging rate time frames) would otherwise result in significantly high temperatures (e.g., significantly higher than ambient temperatures such as, for example, temperatures ranging from about 150° C. to about 560° C.). In contrast, the presently disclosed systems achieve fast charging times and fast charging rates (e.g., from about 60 minutes to about 180 minutes or less for delivering electrical power ranging from about 250 MW to about 1000 MW to substantially fully charge large aircraft vehicle batteries and battery banks; and from about 10 to about 50 mins. or less for delivering electrical power ranging from about 25 MWh to about 100 MWh to charge terrestrial vehicle batteries and terrestrial vehicle battery banks substantially to capacity), while maintaining localized system temperatures (e.g., in a charging region proximate to the vehicle being charged) below about 45° C.

According to further aspects, the collection device is in communication with one or more high-voltage capacitor to act as photovoltaic inverters that convert the DC power produced by the solar cells into AC power, such that the collected or "harvested" renewable energy/solar power is stored (e.g., in a storage bank) in the form of electrical charges and the power can accrue or "build" a large total or cumulative voltage, with the capacitors then able to distribute the stored and converted voltage from the energy storage bank, on demand, including when solar energy is not available to be received (e.g., at nighttime, etc.).

According to further present aspects, transformers are used in presently disclosed power systems for transmission of power without losses at high voltages, and working, for example, on the principle of electromagnetic induction, to convert low voltages to high voltages and vice versa during energy transmission and distribution. According to a further present aspect, a capacitor is in communication with a power-conditioning device such as, for example, a transformer via a first high temperature superconducting (HTS) cable. The transformer converts the power from first (e.g. incoming) voltage and current level to a predetermined second voltage and current level (e.g., outgoing). In further aspects, the power-conditioning device is a power-reducing device such that the transformer facilitates a "step down" of a stored capacitor voltage prior to transferring or otherwise directing the converted electrical energy to further components in the present systems. According to further present aspects, present systems incorporate a second high-temperature superconducting cable that can be in direct communication with the transformer, with the second high-temperature superconducting cable being in further direct communication with a multiplexer. At least one multiplexer can be in communication with at least one of the capacitor and the transformer. According to further aspects, at least one of the capacitor and the transformer can incorporate or otherwise integrate a multiplexer.

The present first and second HTS cables disclosed herein include a cryogenic dielectric having a coaxial configuration comprising an HTS conductor cooled by liquid nitrogen flowing through a flexible hollow core, and an HTS return conductor cooled by circulating liquid nitrogen. The presence of the HIS cables facilitates a highly efficient energy transfer from capacitor to transformer, and from transformer to a multiplexer, a demultiplexer, etc. Further advantages of the use of the HIS cables in the present systems, apparatuses, and methods include large transmission capacity in a compact dimension, small transmission loss, enhanced control of or elimination of leakage of electro-magnetic field to the outside of the cable, small impedance, among other advantages, etc.

With respect to the presently disclosed incorporation of HTS cables, the electrical resistance is zero at temperatures below the critical temperature, so transmission loss is very small, with the no measurable electromagnetic field leakage outside the cable, eliminating eddy current loss from the electromagnetic field. HTS cable energy losses typically come from the alternating current (AC) loss that is comparable to the magnetization loss of the superconductor itself, the dielectric loss of the insulation, and the heat invasion through the thermal insulation piping. To maintain the presently disclosed HTS cables at a predetermined temperature, coolant from a cooling unit is compensates for this heat gain, and the electric power required for the cooling unit, whose efficiency at liquid nitrogen temperature is thought to be approximately 0.1, must be counted as an energy loss. Comparing 66 kV, 3 kA, 350 MVA class cables, the loss of the HTS cable is approximately half that (approximately 50%) of a conventional cable.

In addition, one characteristic of superconducting material is that the lower the operating temperature, the greater the amount of current that can flow. For example, when operating temperature is lowered from 77° K to 70° K, there is an approximately 30% increase in the current-carrying capacity. Further, HTS materials can conduct electricity without resistance when cooled sufficiently (below 77° K, or −196° C./−321° F., for the HTS cables) with liquid nitrogen or liquid helium, used to boost efficiency in some power grids. The tolerances of the HTS cables allows the use of the unusually slender copper core or "former". See FIG. 3.

The significant amounts of energy provided by the system result, in part, from the multiplexing of voltages collected and harvested by the renewable energy collection device (e.g., solar panels, wind turbines, hydroelectric turbines, etc.). Multiplexers in the system in communication with at least one of the capacitor and transformer and can further be integrated into one or more of the capacitor and the transformer. The multiplexers selected for use in the present systems, and according to present aspects, are multiplexers that can increase the supply of renewable electrical energy charges and, in concert with the associated HTS cables used to transfer the renewable electrical energy through the present system, minimize energy loss as the renewable electrical energy is delivered from the multiplexers to the associated demultiplexers. As explained further herein, the demultiplexers are responsible for directing the collected, converted, and multiplexed renewable electrical energy at least one of the renewable electrical energy storage banks and the vehicle battery banks.

As stated herein, according to present aspects, the present systems can include at least one demultiplexer placed in communication with the transformer via a second HTS cable. The demultiplexers, in combination with associate relay circuits incorporated into or in communication with the demultiplexer are configured to separate energy received from the transformer or received from the storage banks (e.g., released on demand from the storage banks) into separate circuits and deliver electricity for an end use at predetermined voltages into separate receiving battery cells to substantially simultaneously charge (e.g., charge in parallel) a plurality of separate battery cells, or battery cell "banks". Such charging scheme, according to present aspects, significantly reduces the overall charging time of a large object to be charged that comprises the battery cell banks (e.g., an aircraft, etc.).

FIG. 1 is an illustration representing a charging system 10 according to present aspects. As shown in FIG. 1, renewable energy that can be, for example, in the form of solar energy, wind power, hydroelectric power, etc.), is collected at a renewable energy collection device 14, to form collected energy that can be converted into converted electrical energy. Accordingly, the renewable energy collection device 14 can be, for example, a solar panel array, a wind turbine, a hydroelectric turbine, etc. As used herein, the term "renewable energy" refers to energy that is not derived from fossil fuels and, instead is energy that is derived from a renewable energy source including, for example, solar power, wind power, water/hydro-electric power, etc.). As further shown in FIG. 1, the converted electrical energy is directed to a high-voltage capacitor 16 via power lines 15. The high-voltage capacitor 16 can incorporate or otherwise be in communication with at least one multiplexer. A first HTS cable 17 is in contact with and otherwise configured to connect the high-voltage capacitor 16 with the transformer 18. The capacitor and/or the transformer can incorporate or otherwise be in communication with at least one multiplexer 16a, 18a.

System 10 further shows a second HTS cable 19 in contact with and otherwise configured to connect the transformer 18 to a demultiplexer 20, with the demultiplexer 20 further including integrated relay circuitry (not shown in FIG. 1). The relay circuitry that can be dedicated relay circuitry is configured to deliver the converted electrical energy via delivery cables 22 to vehicle battery banks 24 of vehicle 23, in the form of an aircraft. Delivery cables 22 can further be HTS cables. As shown in FIG. 1, vehicle battery banks 24 are located within an aircraft wing assembly 26. FIG. 1 shows one location of the vehicle battery banks, such that the vehicle battery banks can are shown located in spaces formerly reserved for liquid fuel tanks. That is, according to present aspects, conventional aircraft fuel tanks can be replaced as a vehicle power supply by the vehicle battery banks. According to present aspects, the comparative weight of the vehicle battery banks can be balanced with respect to one another, and the comparative weight of the vehicle battery bank in total can approximate the weight of filled fuel tanks. Accordingly, the weight of the vehicle battery banks can be designed, for example, to not add weight to the overall vehicle weight as compared to a vehicle having full liquid fuel tanks.

In an alternate aspect, and as also shown in FIG. 1, system 10 can capture, collect, or "harvest" renewable energy from a renewable energy source such as solar energy, that is collected at a renewable energy collection device 14, in the form of a solar panel array, to form collected energy that can be converted into converted electrical energy. As further shown in FIG. 1, the converted electrical energy is directed to a high-voltage capacitor 16 via power lines 15. A first HTS cable 17 is in contact with and otherwise configured to connect the high-voltage capacitor 16 with the transformer 18. Another HTS cable 19 is configured to connect the transformer 18 to a demultiplexer 20. In an alternate aspect, system 10 further shows s second HTS cable 19a in contact with and otherwise configured to connect the transformer 18 to an electrical energy storage bank 21 (referred to equivalently herein as a "renewable energy storage bank"), Another HTS cable 21a in communication with the demultiplexer 20. In this alternate aspect, the converted electrical energy is sent directly from the transformer 18 to the electrical energy storage bank 21 via the second HTS cable 19a, or (in a storage bank charging cycle or mode) from the transformer 18 to the demultiplexer 20 via the HTS cable 19 to the demultiplexer 20 and then through the HTS cable 21a to the electrical energy storage bank 21 (referred to equivalently herein as an "electrical energy storage bank"). In addition, though not specifically shown in FIG. 1, the transformer 18 can incorporate at least one demultiplexer to condition and increase the charges sent from the transformer to the electrical energy storage bank 21.

When a charging demand is recognized by the energy storage bank, converted energy stored in the storage bank can be delivered to the demultiplexer 20 and then delivered from the demultiplexer 20 via the delivery cables 22 to the vehicle battery banks 24 shown located in wing assembly 26 of vehicle 23 to be charged, with vehicle 23 shown in FIG. 1 as an aircraft. Delivery cables 22 can further be HTS cables. The alternate aspect allows for the storage of converted energy into storage banks, for example, during daytime (e.g., when solar energy can be captured and converted), with the release of the converted energy from the storage bank to the vehicle battery banks occurring in either daytime or nighttime. Such arrangement allows the present systems to be used at hours other than daylight hours, as harvested solar energy can be collected, converted and stored during the daylight hours, and then released and delivered for charging a vehicle battery after daylight hours.

FIG. 2 is a partially exposed view of a representative HTS cable used in accordance with the methods, systems, and apparatuses of the present disclosure, and in according to present aspects. As shown in FIG. 2, moving from the center outward, HTS cable 30 includes a core 32 that can be a copper core positioned adjacent to and within a HTS tape layer 33 that is surrounded longitudinally by a high-voltage dielectric layer 34 that is surrounded longitudinally by a HTS shield layer tape layer 36 followed by a copper shield wire layer 38. As further shown in FIG. 2, the copper shield wire layer 38 is surrounded longitudinally by a liquid nitrogen coolant flow 40 that, during operation, can be delivered between the copper shield wire layer 38 and the thermal superinsulator 42 to cool the HTS cable 30 to a temperature ranging from about −30° C. to about 45° C. (e.g., the predetermined operational temperature range of the HTS cables selected, according to present aspects). As further shown in FIG. 2, HTS cable 30 includes inner cryostat wall 44 adjacent to outer cryostat wall 46, with the outer protective coating 48 shown as longitudinally surrounding the outer cryostat wall 46.

The HTS cables used in the methods, systems, and apparatuses and according to present aspects, can deliver electrical energy from the capacitor to the transformer at a rate ranging from about 1 MWh to about 250 MWh. Further, the HTS cables used in the methods, systems, and apparatuses and according to present aspects can transfer and deliver electrical energy from the capacitor to the transformer (and from the transformer to the storage banks, and from the transformer and from the storage banks to the vehicle battery banks) at a rate ranging from up to about 800 MW to about 1000

According to present aspects, the incorporation of the HTS cable allows the transference of very high voltages at high energy distribution rates as the HTS cables operate at low temperatures that result in a significant drop in resistance. The distribution rate at which the presently disclosed systems can transfer electrical energy through the system and to an object for the purpose of charging a battery bank (e.g., a storage battery bank and a vehicle battery bank) within a specified timeframe is important to the viability of a charging system or charging "station" used to charge batteries and then re-charge depleted rechargeable batteries in vehicles including, for example, passenger aircraft. For example, present methods, systems, and apparatuses deliver high voltages to vehicle battery banks at a charging rate ranging from about 25 MWh to about 1000 MWh such that, according to present aspects, a vehicle can be fully charged to operate over a flying range at least equivalent to that achieved using/burning fossil fuels, with the vehicle range that is possible for vehicles charged according to present apparatuses, systems, and methods is restricted only by the electrical energy storage capacity of the battery banks in the vehicle.

While not being bound to a single theory, it is believed that system efficiency and charge delivery from a vehicle battery storage bank to power a vehicle is improved through the charging of a series, or a plurality, of separate rechargeable battery cells. According to one illustrative example, if the vehicle shown in FIG. 1 has two battery banks (one in each wing), each battery bank can include any desired number of separate rechargeable battery cells, including rechargeable lithium ion batteries (equivalently referred to herein as "lithium ion battery cells"). According to present aspects, about 1000 MW of electrical power is delivered to a rechargeable battery at a rate ranging from about 25 MWh to about 1000 MWh, each rechargeable battery cell can be substantially fully charged to a charging capacity in a time duration ranging from about 60 mins. to about 180 mins, or less.

According to present aspects, the ability to deliver a full charge to a passenger aircraft vehicle, for example, within a specified time duration ranging from about 1 hour to about 3 hours, or less, facilitates the planning and scheduling that is used, for example, in the airline industry, as the profitability of the enterprise can be, at least partially, dependent upon an aircraft carrying a certain number of people between scheduled destinations in a certain amount of time, and the number of scheduled routes each aircraft can fly in a specified period of time (e.g., daily, etc.).

The present methods, systems, and apparatuses address and solve several problems presented regarding the repeatable, scheduled, reliable, etc. delivery of vast amounts of renewable energy to power a large vehicle (e.g., a passenger aircraft) in a short, scheduled duration such that the use of renewable electrical energy as an energy source is not just theoretical, but can be implemented into a practical, reliable, cost-effective, and sustainable way that does not impact a geographic electrical energy grid. According to present aspects, the use of a renewable energy source (e.g., solar power, wind power, hydroelectric power, etc.) solves the issues that would otherwise exist regarding the diversion of vast amounts of electricity from an established "grid" and used to power the electricity/power needs of a certain geographic area.

The use and integration into present systems of HTS cables allows the reliable and safe transfer of extremely large amounts of electricity from an energy source (including, for example, from an energy storage facility or device) to a passenger vehicle at high rates of efficient energy transfer, and electrical energy delivery that facilitates not only the charging of rechargeable battery cell banks in a large vehicle within a required and scheduled time duration that is similar to fossil fuel refueling times, and that can also deliver vast amounts of electricity to and from energy storage (e.g., energy storage banks, etc.), and from the energy storage to a rechargeable battery cell bank in a vehicle without the generation of significant amounts of heat that would otherwise be realized, and that otherwise could pose significant safety concerns, or that could otherwise make such a system impractical and unsafe.

According to further aspects, the HTS cables affect the efficient transfer of electrical energy at low temperatures that not only satisfy safety concerns, but that also facilitate the quick delivery of vast amounts of energy at a significantly low resistance and at low operational temperatures of such cables. FIG. 3 is a graph plotting resistance versus temperature/° K. As shown in FIG. 3, at very low temperatures, electrical resistance drops significantly. Since the HTS cables that are incorporated into the present apparatuses and systems operate at a temperature ranging from about −30° C. to about 45° C., during a charge delivery cycle, when electrical power up to about 1000 MW is passed through the systems according to present aspects, a temperature increase (a temperature increase change compared to ambient temperatures) of only about 25° C. is realized. That is, the energy collection, energy storage, and energy dispensing/delivery systems (e.g., charging systems) according to present aspects are designed to deliver total amounts of energy at the desired charging voltages within the required time frames to substantially fully charge passenger vehicle battery banks with the disclosed systems operating within a temperature range ranging from about −30° C. to about 45° C.

FIG. 4 is an illustration of a representative demultiplexer that can be implemented, according to present aspects, that facilitates the separation and delivery of electrical charges from a transformer to separate battery cells that, taken together, can comprise, for example, a vehicle battery bank or a storage battery bank, both of which can be rechargeable.

A demultiplexer (or demux) is a device taking one main input power line into the demux, with the incoming power then routed from the demux via several output lines. A demux of 2″ outputs has "n" number of select lines that are used to select from which output line to send the power received from the input. A demultiplexer of the type disclosed herein can also be referred to equivalently as a type of "power distributor" and are designed to divide voltage and branch them the multiplexers could be solid state or mechanical-electro relay. Depending on the amount of power is going through them.

As shown in FIG. 4, demultiplexer 20 is in communication with second HTS cable 19 connecting the transformer 18 (not shown in FIG. 4, but as shown in FIG. 1) and demultiplexer 20. Demultiplexer 20 is further shown in communication with (or as otherwise integrally comprising as a part of the demultiplexer) individual relay circuits 54 with leads that can deliver converted electrical energy from the demultiplexer to a vehicle battery bank or a storage battery bank locate remotely from a vehicle.

FIG. 5 is an illustration of a representative demultiplexer that facilitates the separation and delivery of electrical charges from a transformer to separate battery cells that, taken together, comprise a passenger vehicle battery bank or a storage battery bank. According to present aspects, FIG. 5 shows an enlarged representative view of a demultiplexer of the type incorporated into present systems and shown, for example, in FIG. 1. As shown in FIG. 5, demultiplexer 20 is in communication with second HTS cable 19 connecting the transformer 18 (not shown in FIG. 4 or FIG. 5, but as shown in FIG. 1) and demultiplexer 20. As further shown in FIG. 5, demultiplexer 20 includes an integrated superconducting voltage divider 50 (referred to equivalently here as a superconducting "splitter") that is further in communication with individual relay circuits 54 that can be integrated into or that are otherwise in communication with demultiplexer 20.

As further shown in FIG. 5, an individual circuit in the demultiplexer can be responsible for delivering an individual charge to an individual battery cell 56 in the rechargeable vehicle battery bank 24 that will occupy a space in, for example, a vehicle interior (e.g., a passenger aircraft wing interior, etc.) as shown in FIG. 1, or the individual charges can be directed, if desired to individual cells in a battery storage bank located remotely from the vehicle and that is a part of the overall system and that can be used to store harvested/collected renewable energy that has been converted into converted electrical energy. The stored electrical energy in the storage banks can then be delivered to a rechargeable vehicle battery on demand by electrical energy delivery cables that can be HTS cables from the storage bank to the rechargeable vehicle battery cells. As shown in FIG. 5, the individual battery cells 56 are shown in a stacked orientation to form the vehicle battery bank 24, that is not drawn to scale.

According to further present aspects, battery cell banks can include a plurality of rechargeable lithium-ion (herein also denoted as "Li-ion") battery cells that can be arranged, for example, in a stacked or a side-by-side configuration, etc., with the Li-ion cells made according to a predetermined shape that can be dimensioned such that the Li-ion cell, or a plurality of appropriately dimensioned Li-ion battery cells can be housed in a battery cell cavity, that can be located in a vehicle such as, for example, the interior of an aircraft wing, etc. (e.g., a cavity that formerly housed, for example, an aircraft fuel tank, etc.).

The Li-ion battery cells can be dimensioned such that the dimension of the plurality of cells vary relative to one another and are dimensioned individually, or in concert, to substantially completely fill (or otherwise "fit" within) a regular or an irregular cavity space when assembled into an interior cavity, void, or other holding space in the vehicle (e.g., a passenger aircraft wing interior, including, for example, a passenger aircraft wing interior that formerly housed, for example, a liquid fuel tank, etc.). In other words, according to present aspects, the vehicle battery cell bank that can comprise a plurality of individual rechargeable Li-ion battery cells (or that can comprise one large battery cell) can be shaped and otherwise dimensioned to occupy the holding space, etc.

According to present aspects, Table 1 sets forth various battery types, the operating temperatures of a battery type it receives a charge, specified charging rates, and the duration required to achieve a charge at a specified charging rate.

According to present aspects, potentially prior to an aircraft's arrival at a gate, an amount of radiant or solar energy has been collected by the renewable energy collection device (e.g., solar array) and converted from the collected solar energy to converted electrical energy. The converted electrical energy is further processed by a capacitor that itself stores an amount of energy, or that is communication with energy storage banks. The converted electrical is directed through a transformer via HTS cable(s) and then directed to a demultiplexer. The demultiplexer comprises or is otherwise in communication with a plurality of dedicated circuits designed and otherwise configured to direct and distribute an electrical charge of the converted and stored electrical energy from the multiplexer to a vehicle battery cell or among a plurality of individual vehicle battery cells (e.g., individual rechargeable Li-ion vehicle battery cells) in the vehicle battery bank. The totality of components comprises an apparatus or system that collectively is referred to as a "charging station". Upon connecting a charging station outlet to a vehicle charging inlet, the vehicle is in condition to receive a charge from the charging station. In the charging mode, according to present aspects, the demultiplexer in combination with the FITS cables can deliver an electrical charge to a plurality of vehicle battery cells within the vehicle battery bank at a charging rate of from about 25 MWh. to about 100 MWh. According to present aspects, the significant rapid charge duration would is selected to satisfy a vehicle's charging demands and is further selected to satisfy the refueling period duration between flights, with an interim gate time of an aircraft between flight, with the selected refueling duration ranging from between about 1 hour to about 3 hours.

When the renewable energy resource is other than solar power (e.g., wind power, hydroelectric power, etc.), the collection device can include a turbine that can be, for example, a wind turbine or a hydroelectric turbine, etc. The systems, apparatuses, and methods described herein, as well as the components of such systems and apparatuses described herein (e.g., the capacitor, transformer, multi-

TABLE 1

| Charging Type | Battery Chemistry | Charging Rate (Coulombs, C) | Duration to Full Charge | Temperature Range (° C.) During Charging | Charge Termination |
|---|---|---|---|---|---|
| Slow charge | NiCd; lead | 0.1C | 14 hr. | 0° C. to 45° C. | Subject to overcharge/battery removal upon charge required |
| Rapid Charge | NiCd; NiMH; Li-ion | 0.3 to 0.5C | 3 to 6 hr. | 10° C. to 45° C. | Sensing battery voltage, current |
| Fast Charge | NiCd; NiMH; Li-ion | 1C | 1 hr+ | 10° C. to 45° C. | Sensing battery voltage, current |
| Ultra-Fast Charge | Li-ion, NiCd, NiMH | 1-10C | 10-60 min. | 10° C. to 45° C. | |

Traditional charging times for vehicle batteries requiring significant range of operation, and other roadblocks have hindered the practical use of electricity as a fuel source for passenger aircrafts. That is, in accordance with regulatory and operational demands, refueling an aircraft must be conducted within practical time constraints. According to present aspects, the following Example outlines a charging event for a large vehicle such as a passenger aircraft that can be charged in a fashion that replaces the fossil fuel refueling that typically occurs at a gate of an airport.

plexer, demultiplexer, delivery circuits, HTS cable(s), battery cells, and battery cell banks, etc.), can be incorporated with a predetermined non-solar renewable energy collection device to collect, store, and distribute energy collected from the preselected non-solar renewable energy source, in similar fashion to that described for the solar energy collection, storage and distribution, including the voltage delivery rates, charging times, etc. as described herein.

FIGS. 6-10 are flowcharts outlining present methods according to present aspects. As shown in FIG. 6, a method 100 includes collecting 102 energy from a renewable energy source to form an amount of collected electrical energy, converting 104 the collected electrical energy using at least one capacitor to form converted electrical energy; directing 106 converted electrical energy from the at least one capacitor via a first high temperature super conducting cable to a transformer, directing 108 converted electrical energy from the transformer via a second high temperature super conducting cable to a demultiplexer. The method further includes directing (equivalently referred to herein as "distributing") 110 converted electrical energy from the demultiplexer substantially equally to a plurality of rechargeable vehicle batteries. In this aspect, converted electrical energy from the transformer is directed to the rechargeable vehicle battery via the demultiplexer without necessarily first storing energy in a storage bank (e.g., with the storage bank located externally and remotely from the vehicle, etc.).

According to alternate aspects, described more fully in connection with FIGS. 9 and 10, present methods can include aspects shown in at least FIGS. 1, 2, 4, 5, and 6 that include collecting 102 energy from a renewable energy source to form an amount of collected electrical energy, converting 104 the collected electrical energy using at least one capacitor to form converted electrical energy; directing 106 converted electrical energy from the at least one capacitor via a first high temperature super conducting cable to a transformer, directing 108 converted electrical energy from the transformer via a second high temperature super conducting cable to a first demultiplexer 20, followed by distributing (equivalently referred to herein as "dispensing") converted electrical energy from the first demultiplexer to an electrical energy storage bank and then optionally directing converted electrical energy from the electrical energy storage bank (and optionally to one or more additional demultiplexers), followed by directing converted electrical energy from at least one of the storage bank or the one or more demultiplexers 20a to a rechargeable vehicle battery 24a, for example, via further HTS cable 22a in communication with the demultiplexer 20a.

In an alternate aspect that, for example, contemplates charging a rechargeable vehicle battery at night (e.g., when solar power is not available to be collected in real time and directed in real time to an end use), converted electrical energy from the renewable energy source that has been previously collected and converted is directed to and stored in a storage bank. The converted and stored electrical energy is then directed from the storage bank, on demand, to the rechargeable vehicle battery.

Whether the converted energy is directed to the rechargeable vehicle battery from the transformer, from the storage bank, or from both from the transformer and from the storage bank, the converted electrical energy can be directed to the rechargeable vehicle battery from at least one demultiplexer to substantially fully charge the rechargeable vehicle batteries while, as shown at least in FIG. 7, maintaining 112 the charging at a temperature ranging from about −30° C. to about 45° C. while substantially fully charging 114 a rechargeable vehicle battery, for example, at a charging rate ranging from about 25 MWh to about 100 MWh. Methods as shown at least in FIG. 6 can comprise the systems and apparatuses shown in one or more of FIGS. 1, 2, 4, and 5.

As shown in FIG. 7, a method 200 includes the steps (102, 104, 106, 108, 110, 112, 114) of method 100 shown in FIG. 6, with method 200 also including, after converting 104 the collected electrical energy using at least one capacitor to form converted electrical energy, storing 202 an amount of converted energy in a storage bank, with at least one of the capacitor and the transformer in communication with an energy storage bank. Present aspects contemplate substantially simultaneously (in the case of converting solar energy, for example, during daylight or daytime hours), directing converted electrical energy from a renewable energy source to at least one of and, if desired, to both of: 1) a rechargeable vehicle battery and/or rechargeable vehicle battery bank or banks; and 2) a converted electrical energy storage bank (e.g., located externally from and remotely from a vehicle to be charged). Further alternate aspects include delivering amounts of converted electrical energy to a rechargeable vehicle battery from either or both of the system in operation (while renewable energy is being captured and converted), and also from the storage bank (e.g., in alternating energy delivery cycles, or substantially simultaneously, etc.). Methods as shown at least in FIG. 7 can include the systems and apparatuses shown in one or more of FIGS. 1, 2, 4, 5 and 6.

As shown in FIG. 8, method 300, can include the method 100 shown in FIG. 6, and further includes charging 302 a plurality of rechargeable vehicle batteries at a charging rate ranging from about 1 MWh to about 100 MWh, while maintaining 304 a temperature throughout the system of less than about 45° C. during the duration of energy distribution cycles. An amount of electrical energy at a rate ranging from about 250 MW to about 1000 MW of electrical energy can be distributed from the demultiplexer to the plurality of rechargeable vehicle batteries during a charging duration, and the rechargeable vehicle batteries can include rechargeable Li-ion batteries, and with the charging cycle durations ranging from about 1 to about 3 hours. Methods as shown in FIG. 8 can include the systems and apparatuses shown in one or more of FIGS. 1, 2, 4, 5, 6 and 7.

According to another present aspect shown in FIG. 9, a method 400 is disclosed including collecting 402 energy from a renewable energy source to form an amount of collected electrical energy, converting 404 the collected electrical energy using a capacitor to form converted electrical energy, storing 406 an amount of the converted electrical energy in a plurality of electrical energy storage banks to form an amount of stored electrical energy, and dispensing (e.g., directing) 408 an amount of at least one of the stored electrical energy or converted electrical energy directly from the system in the form of dispensed electrical energy from at least one of the electrical energy storage bank or a transformer to a plurality of rechargeable vehicle batteries via at least one high temperature superconducting cable and at least one demultiplexer, wherein dispensed electrical energy is delivered to the plurality of rechargeable vehicle batteries at a charging rate ranging from about 1 MWh to about 100 MWh. In another aspect, dispensed electrical energy is delivered to the plurality of rechargeable vehicle batteries at a charging rate ranging from about 25 MWh to about 100 MWh. Methods as shown in FIG. 9 can include the systems and apparatuses shown in one or more of FIGS. 1, 2, 4, 5, 6, 7 and 8.

In another aspect, as shown in FIG. 10, a method 500 includes the steps 402, 404, 406, and 408 shown in method 400 (shown in FIG. 9) and, after the step of storing 406 an amount of the converted electrical energy and before the step of dispensing 408 an amount of the stored electrical energy, the method further includes directing 502 an amount of the stored electrical energy from the electrical energy storage banks to a demultiplexer, and directing 504 electrical energy from the demultiplexer to a circuit (e.g., a relay circuit), with the circuit in communication with a plurality of rechargeable vehicle batteries. The methods outlined in FIGS. 6, 7, 8, 9, and 10 incorporate the systems and apparatuses described herein, including those presented in any of FIGS. 1, 2, 3, 4, and 5.

The present aspects may, of course, be carried out in other ways than those specifically set forth herein without departing from aspects and characteristics of the disclosure. The present aspects are to be considered in all respects as illustrative and not restrictive, and all changes coming within the meaning and equivalency range of the appended claims are intended to be embraced therein.

What is claimed is:

1. A system for charging vehicles comprising:
   a renewable energy collection device configured to collect renewable energy from a renewable energy source, said renewable energy source comprising at least one of: solar power, wind power, and hydroelectric power;
   a high-voltage capacitor in communication with the renewable energy collection device;
   a first high temperature superconducting cable in communication with the high-voltage capacitor;
   a transformer in communication with the first high temperature superconducting cable;
   a second high temperature superconducting cable in communication with the transformer;
   at least one demultiplexer in communication with the second high temperature superconducting cable, said at least one demultiplexer configured to engage a relay circuit, said relay circuit configured to deliver converted electrical energy to at least one rechargeable vehicle battery;
   wherein at least one of the high-voltage capacitor and the transformer is in communication with at least one multiplexer; and
   wherein the at least one demultiplexer is configured to deliver electrical power up to 1000 MW to at least one of a storage bank and the at least one rechargeable vehicle battery.

2. The system of claim 1, wherein the at least one rechargeable vehicle battery comprises a plurality of lithium ion cells.

3. The system of claim 1, wherein a temperature during a transfer of an amount of electrical energy through the system does not exceed 45° C.

4. A system for charging vehicles comprising:
   a renewable energy collection device configured to collect renewable energy from a renewable energy source, said renewable energy source comprising at least one of: solar power, wind power, and hydroelectric power;
   a high-voltage capacitor in communication with the renewable energy collection device;
   a first high temperature superconducting cable in communication with the high-voltage capacitor;
   a transformer in communication with the first high temperature superconducting cable;
   a second high temperature superconducting cable in communication with the transformer;
   at least one demultiplexer in communication with the second high temperature superconducting cable, said at least one demultiplexer configured to engage a relay circuit, said relay circuit configured to be in communication with at least one rechargeable vehicle battery;
   a vehicle comprising the at least one rechargeable vehicle battery, said at least one rechargeable vehicle battery in communication with the at least one demultiplexer via the relay circuit, said at least one rechargeable vehicle battery configured to receive converted electrical energy from the at least one demultiplexer via the relay circuit;
   wherein at least one of the high-voltage capacitor and the transformer is in communication with at least one multiplexer; an wherein the at least one demultiplexer is configured to deliver electrical power up to 1000 MW to at least one of an electrical energy storage bank and the at least one rechargeable vehicle battery; and
   wherein the high-voltage capacitor is further in communication with the electrical energy storage bank, said electrical energy storage bank configured to store the renewable energy collected by the renewable energy collection device.

5. The system of claim 4, wherein the system has an operating temperature range ranging from −30° C. to 45° C.

6. The system of claim 4, wherein the at least one demultiplexer comprises relay mechanisms, said relay mechanisms configured to distribute a predetermined amount of the electrical energy to the at least one rechargeable vehicle battery.

7. The system of claim 4, wherein the vehicle is an aircraft.

8. The system of claim 4, wherein the vehicle comprises at least one of:
   a crewed aircraft; an uncrewed aircraft; a crewed rotorcraft, an uncrewed rotorcraft; a crewed spacecraft; an uncrewed spacecraft;
   a crewed terrestrial vehicle; an uncrewed terrestrial vehicle; a crewed surface waterborne vehicle; an uncrewed surface waterborne vehicle; a crewed sub-surface waterborne vehicle; an uncrewed sub-surface waterborne vehicle; and a hovercraft.

9. The system of claim 4, wherein the vehicle comprises a plurality of the rechargeable vehicle batteries, said plurality of rechargeable vehicle batteries comprising a plurality of lithium ion cells.

10. The system of claim 9, wherein the at least one demultiplexer comprises the relay circuit, said relay circuit configured to distribute a predetermined amount of the electrical energy to each of the plurality of the rechargeable vehicle batteries.

11. The system of claim 4, wherein electric energy up to 250 MW is delivered to the high-voltage capacitor.

12. The system of claim 4, wherein converted electrical energy up to 1000 MW is delivered to the relay circuit from the at least one demultiplexer.

13. The system of claim 4, wherein a temperature during a transfer of the electrical energy through the system does not exceed a temperature of 45° C.

14. The system of claim 4, wherein the system has an operating temperature range ranging from −30° C. to about 45° C.

15. The system of claim 4, wherein the renewable energy collection device is configured to deliver the collected renewable energy to the high-voltage capacitor.

16. A method for collecting and dispensing energy, the method comprising:
   collecting renewable energy from a renewable energy source to form collected electrical energy;
   converting the collected electrical energy using at least one high-voltage capacitor to form converted electrical energy;
   directing the converted electrical energy from the at least one high-voltage capacitor via a first high temperature super conducting cable to a transformer;

directing the converted electrical energy from the transformer via a second high temperature super conducting cable to a first demultiplexer;

distributing the converted electrical energy from the first demultiplexer to at least one rechargeable vehicle battery;

maintaining a temperature ranging from −30° C. to 45° C. during the distribution of the converted electrical energy from the first demultiplexer to the at least one rechargeable vehicle battery;

charging the at least one rechargeable vehicle battery;

distributing the converted electrical energy from the first demultiplexer to an electrical energy storage bank;

distributing the converted electrical energy from the electrical energy storage bank to a second demultiplexer;

wherein an amount of electrical energy is distributed at a rate ranging from 250 MW to 1000 MW from the second demultiplexer to the at least one rechargeable vehicle battery at a charging rate ranging from 1 MWh to 100 MWh;

wherein at least one of the high-voltage capacitor and the transformer is in communication with at least one multiplexer.

17. The method of claim 16, further comprising:
delivering the converted electrical energy from the electrical energy storage bank via the second demultiplexer to the at least one rechargeable vehicle batteries at a rate ranging from 250 MW to 1000 MW in a duration ranging from 1 hour to 3 hours.

18. The method of claim 16, wherein the transformer is in communication with the electrical energy storage bank.

19. The method of claim 16, wherein the electrical energy storage bank comprises a plurality of battery cells.

20. The method of claim 16, wherein the at least one rechargeable vehicle battery comprises a plurality of lithium ion vehicle battery cells.

21. The method of claim 20, further comprising:
charging the plurality of lithium ion vehicle battery cells at a charging rate ranging from 1 MWh to 100 MWh.

22. The method of claim 20, further comprising:
delivering the converted electrical energy to the plurality of lithium ion vehicle battery cells; and
fully charging the plurality of lithium ion vehicle battery cells within a specified charging duration ranging from 10 minutes to 3 hours.

23. The method of claim 16, further comprising:
maintaining a temperature of less than 45° C. during a duration of distributing the converted electrical energy to the at least one rechargeable vehicle battery.

24. The method of claim 16, wherein the renewable energy source comprises at least one of: solar power; wind power; hydroelectric power; and combinations thereof.

25. A method for charging a vehicle battery comprising:
collecting energy from a renewable energy source and storing the collected electrical energy;
converting the collected electrical energy using a high-voltage capacitor to converted electrical energy;
storing the converted electrical energy in at least one electrical energy storage bank as stored electrical energy;
dispensing at least one of: the converted electrical energy and the stored electrical energy to at least one rechargeable vehicle battery via at least one high temperature superconducting cable; and
dispensing at least one of: the converted electrical energy and the stored electrical energy via a demultiplexer to the at least one rechargeable vehicle battery at a charging rate ranging from 1 MWh to 100 MWh, said demultiplexer in communication with the at least one high temperature superconducting cable;
wherein the high-voltage capacitor is in communication with at least one multiplexer; and
wherein the demultiplexer is configured to deliver electrical power up to 1000 MW of the converted electrical energy to at least one of the electrical energy storage bank and the at least one rechargeable vehicle battery.

26. The method of claim 25, further comprising:
directing the converted electrical energy from the demultiplexer to a plurality of circuit outputs, each of said plurality of circuit outputs individually dedicated to a corresponding one of the at least one rechargeable vehicle batteries.

27. The method of claim 26, wherein the demultiplexer is in communication with the at least one electrical energy storage bank, said at least one electrical energy storage bank further in communication with a plurality of rechargeable lithium ion vehicle battery cells via the at least one high temperature superconducting cable.

28. The method of claim 27, wherein the demultiplexer comprises a relay circuit, said relay circuit configured to distribute a predetermined amount of the converted electrical energy to the plurality of rechargeable lithium ion vehicle battery cells.

29. The method of claim 25, wherein the renewable energy source comprises at least one of: solar power, wind power, hydroelectric power, and combinations thereof.

* * * * *